(12) United States Patent
Turner et al.

(10) Patent No.: US 10,782,396 B2
(45) Date of Patent: Sep. 22, 2020

(54) VARIATIONAL TRACK MANAGEMENT

(71) Applicants: Ryan D. Turner, Santa Cruz, CA (US); Steven Bottone, Poway, CA (US); Bhargav R. Avasarala, Arlington, VA (US); Clay J. Stanek, Sterling, VA (US)

(72) Inventors: Ryan D. Turner, Santa Cruz, CA (US); Steven Bottone, Poway, CA (US); Bhargav R. Avasarala, Arlington, VA (US); Clay J. Stanek, Sterling, VA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 16/385,991

(22) Filed: Apr. 16, 2019

(65) Prior Publication Data

US 2019/0242988 A1    Aug. 8, 2019

Related U.S. Application Data

(62) Division of application No. 14/563,824, filed on Dec. 8, 2014, now Pat. No. 10,310,068.

(51) Int. Cl.
*G01C 9/00* (2006.01)
*G01S 13/72* (2006.01)
*G01S 7/41* (2006.01)

(52) U.S. Cl.
CPC ............. *G01S 13/726* (2013.01); *G01S 7/411* (2013.01)

(58) Field of Classification Search
CPC .............................. G01S 7/411; G01S 13/726
(Continued)

(56) References Cited

U.S. PATENT DOCUMENTS 3,689,924 A    9/1972    Caruso, Jr.
3,883,876 A    5/1975    Roeder et al.
(Continued)

OTHER PUBLICATIONS

Broadhurst et al., "Monte Carlo Road Safety Reasoning", Intelligent Vehicles Symposium, Jun. 6-8, 2005 IEEE Proceedings (2005) pp. 319-324.*
(Continued)

*Primary Examiner* — Jay C Kim
(74) *Attorney, Agent, or Firm* — Tarolli, Sundheim, Covell & Tummino LLP (57) ABSTRACT

Systems and methods are provided for tracking moving objects from a set of measurements. An estimate of a posterior probability distribution for a plurality of track states is determined from an estimate of the posterior probability distribution for a plurality of possible assignments of the set of measurements to a set of tracks representing trajectories of the plurality of moving objects and the set of measurements. A new estimate of the posterior probability distribution for the assignments is determined from the measurements and the estimate of a posterior probability distribution for the track states. A variational lower bound is determined from the new estimate of the posterior probability distribution for the assignments, the estimate of the posterior probability distribution for the track states, and the set of measurements. These steps are iteratively repeated until the variational lower bound is less than a threshold value.

11 Claims, 5 Drawing Sheets

(58) Field of Classification Search
USPC .......................................................... 702/150
See application file for complete search history.

(56) References Cited

U.S. PATENT DOCUMENTS

| | | | |
|---|---|---|---|
| 4,115,776 A | 9/1978 | Roeder et al. | |
| 4,150,379 A | 4/1979 | Connors | |
| 5,430,445 A | 7/1995 | Peregrim et al. | |
| 5,510,990 A * | 4/1996 | Hibino | B60K 31/0008 |
| | | | 701/96 |
| 5,537,119 A | 7/1996 | Poore, Jr. | |
| 5,959,574 A | 9/1999 | Poore, Jr. | |
| 6,240,198 B1 | 5/2001 | Rehg et al. | |
| 6,259,396 B1 * | 7/2001 | Pham | G01S 7/412 |
| | | | 342/175 |
| 6,269,172 B1 | 7/2001 | Rehg et al. | |
| 6,591,146 B1 | 7/2003 | Pavlovic et al. | |
| 6,683,968 B1 | 1/2004 | Pavlovic et al. | |
| 6,694,044 B1 | 2/2004 | Pavlovic et al. | |
| 6,795,567 B1 | 9/2004 | Cham et al. | |
| 6,801,155 B2 * | 10/2004 | Jahangir | G01S 7/415 |
| | | | 342/189 |
| 6,993,462 B1 | 1/2006 | Pavlovic et al. | |
| 7,053,817 B2 * | 5/2006 | Nakano | G01S 13/582 |
| | | | 342/90 |
| 7,081,849 B2 * | 7/2006 | Collins | G01S 13/726 |
| | | | 342/160 |
| 7,193,557 B1 | 3/2007 | Kovacich et al. | |
| 7,289,060 B1 * | 10/2007 | Abatzoglou | G01S 7/412 |
| | | | 342/175 |
| 7,567,203 B2 * | 7/2009 | Dizaji | G01S 7/415 |
| | | | 342/90 |
| 7,596,241 B2 | 9/2009 | Rittscher et al. | |
| 7,710,248 B2 | 5/2010 | Greene et al. | |
| 7,792,641 B2 | 9/2010 | Liu et al. | |
| 7,813,544 B2 | 10/2010 | Fukaya et al. | |
| 7,817,822 B2 | 10/2010 | Sun et al. | |
| 7,831,391 B2 | 11/2010 | Greene et al. | |
| 7,881,868 B2 | 2/2011 | Greene et al. | |
| 8,055,445 B2 * | 11/2011 | Schiffmann | G01S 13/867 |
| | | | 701/301 |
| 8,131,011 B2 | 3/2012 | Nevatia et al. | |
| 8,232,908 B2 * | 7/2012 | Sathyendra | G01S 7/295 |
| | | | 342/25 F |
| 8,352,173 B2 | 1/2013 | Greene et al. | |
| 8,463,579 B2 | 6/2013 | Vierinen | |
| 8,519,882 B2 * | 8/2013 | Huizing | G01S 7/414 |
| | | | 342/25 R |
| 8,594,982 B2 | 11/2013 | Mott et al. | |
| RE44,807 E | 3/2014 | Poore, Jr. | |
| 8,688,675 B2 | 4/2014 | Albers et al. | |
| 8,705,797 B2 * | 4/2014 | Zeng | G01S 13/867 |
| | | | 382/103 |
| 8,730,091 B2 * | 5/2014 | Sathyendra | G01S 7/412 |
| | | | 342/90 |
| 8,781,796 B2 | 7/2014 | Mott et al. | |
| 8,849,017 B2 | 9/2014 | Ito et al. | |
| 8,909,589 B2 * | 12/2014 | Horwood | G06K 9/6292 |
| | | | 706/52 |
| 8,954,272 B2 * | 2/2015 | Adam | G01S 13/726 |
| | | | 701/519 |
| 9,240,053 B2 | 1/2016 | Mathews et al. | |
| 9,297,886 B1 * | 3/2016 | Mountcastle | G01S 7/36 |
| 9,299,010 B2 * | 3/2016 | Sathyendra | G06K 9/6267 |
| 9,562,965 B2 * | 2/2017 | Georgy | G01S 5/0294 |
| 9,889,858 B2 * | 2/2018 | Schmudderich | B60W 50/14 |
| 2003/0085831 A1 * | 5/2003 | Lavoie | G01S 7/021 |
| | | | 342/13 |
| 2005/0105764 A1 | 5/2005 | Han et al. | |
| 2006/0018516 A1 | 1/2006 | Masoud et al. | |
| 2006/0165811 A1 | 7/2006 | Black et al. | |
| 2008/0071714 A1 | 3/2008 | Menich et al. | |
| 2009/0041297 A1 | 2/2009 | Zhang et al. | |

OTHER PUBLICATIONS

Munz et al., "A Sensor Independent Probabilistic Fusion System for Driver Assistance Systems", Proceedings of the 12th International IEEE Conference on Intelligent Transportation Systems, St. Louis, MO, USA, Oct. 3-7, 2009 (2009) pp. 438-443.*

* cited by examiner

VARIATIONAL TRACK MANAGEMENT

RELATED APPLICATIONS

This application claims priority from U.S. patent application Ser. No. 14/563,824, filed 8 Dec. 2014, which is incorporated herein in its entirety.

BACKGROUND OF THE INVENTION

Field of the Invention

The invention relates generally to object tracking, and more specifically, to the use of variational track management in tracking moving objects.

Background of the Invention

Object tracking is the use of measurements of position, velocity, acceleration, and other kinematic parameters, to obtain an accurate determination of the positions of one or more moving objects. The field of object tracking is broad and possesses many applications, particularly in radar/sonar, robotics, and computer vision. When tracing an object, a system constructs a track that estimates the trajectory of the object over time. Where multiple objects are tracked, object tracking generally involves three steps. The first step is a data assignment process, in which various measurements are matched to existing tracks. This matching can often be supplemented by non-kinematic features of the plurality of moving objects, such as a radar cross-section in radar, or a color or shape in visual spectrum tracking, to more easily distinguish among the moving objects when the kinematic data is ambiguous. A second step is a filtering process, in which the assigned data is used to update the positions of the various objects to reduce or eliminate measurement error. Finally, a track management component utilizes various heuristics to remove or add tracks as needed due to clutter, or spurious measurements, or objects arriving in or leaving a region of interest. While there will be communication among the components performing these three functions, they generally act substantially independently.

SUMMARY OF THE INVENTION

In accordance with an aspect of the present invention, a method is provided for tracking moving objects from a set of measurements provided by an associated sensor system. An estimate of a posterior probability distribution for a plurality of track states is determined from an estimate of the posterior probability distribution for a plurality of possible assignments of the set of measurements to a set of tracks representing trajectories of the plurality of moving objects and the set of measurements. A new estimate of the posterior probability distribution for the plurality of possible assignments of the set of measurements to the set of tracks is determined from the set of measurements and the estimate of a posterior probability distribution for a plurality of track states. A variational lower bound, representing a lower bound for the marginal probability of the set of measurements given a model defined by the new estimate of the posterior probability distribution and the estimate of a posterior probability distribution for a plurality of track states, is determined from the new estimate of the posterior probability distribution for the plurality of possible assignments of the set of measurements to the set of tracks, the estimate of a posterior probability distribution for a plurality of track states, and the set of measurements. The steps of determining an estimate of a posterior probability distribution for a plurality of track states, determining a new estimate of the posterior probability distribution for the plurality of possible assignments of the set of measurements to the set of tracks, and determining a variational lower bound are iteratively repeated until the variational lower bound is less than a threshold value.

In accordance with another aspect of the present invention, a system is provided for tracking a plurality of moving objects. A sensor system is configured to provide a set of measurements representing at least respective positions of the plurality of moving objects. A track state updating component is configured to determine an estimate of a posterior probability distribution for a plurality of track states from an estimate of the posterior probability distribution for a plurality of possible assignments of the set of measurements to a set of tracks representing trajectories of the plurality of moving objects and the set of measurements. A track assignment updating component is configured to determine a new estimate of the posterior probability distribution for the plurality of possible assignments of the set of measurements to the set of tracks from the set of measurements and the estimate of a posterior probability distribution for the plurality of track states. A lower bound computation component is configured to compute a variational lower bound, representing a lower bound for the marginal probability of the set of measurements given a model defined by the new estimate of the posterior probability distribution and the estimate of a posterior probability distribution for a plurality of track states, from the new estimate of the posterior probability distribution for the plurality of possible assignments of the set of measurements to the set of tracks, the estimate of a posterior probability distribution for a plurality of track states, and the set of measurements. Each of the track state updating component, the track assignment updating component, and the lower bound computation component collectively perform an iterative determination of the posterior probability distribution for the plurality of possible assignments of the set of measurements to the set of tracks and the posterior probability distribution for a plurality of track states until the variational lower bound is less than a threshold value.

In accordance with yet another aspect of the present invention, a non-transitory computer readable medium stores executable instructions readable by an associated processor to perform a method for tracking at least respective positions of a plurality of moving objects from a set of measurements provided by an associated radar system. An estimate of a posterior probability distribution for a plurality of track states is determined from an estimate of the posterior probability distribution for a plurality of possible assignments of the set of measurements to a set of tracks representing trajectories of the plurality of moving objects and the set of measurements. The plurality of track states include a position state for each track and a metastate for each track representing an active or dormant status for the track. A new estimate of the posterior probability distribution for the plurality of possible assignments of the set of measurements to the set of tracks is determined from the set of measurements and the estimate of a posterior probability distribution for a plurality of track states. A variational lower bound, representing a lower bound for the marginal probability of the set of measurements given a model defined by the new estimate of the posterior probability distribution and the estimate of a posterior probability distribution for a plurality of track states, is determined from the new estimate of the posterior probability distribution for the plurality of possible assignments of the set of measurements to the set of tracks, the estimate of a posterior probability distribution for a plurality of track states, and the set of measurements. The steps of determining an estimate of a posterior probability distribution for a plurality of track states, determining a new estimate of the posterior probability distribution for the plurality of possible assignments of the set of measurements to the set of tracks, and determining a variational lower bound are iteratively repeated until the variational lower bound is less than a threshold value.

BRIEF DESCRIPTION OF THE DRAWINGS

The features, objects, and advantages of the invention will become more apparent from the detailed description set forth below when taken in conjunction with the drawings, wherein.

DETAILED DESCRIPTION OF THE INVENTION

Most tracking algorithms treat a data association process and a filtering process as separate, alternating sequential steps. This is due to the vast number of possible data associations in situations where there are even several tracks and corresponding measurements. Data association is usually treated as a discrete optimization problem, where measurements over just a few time steps, generally no more than three, are assigned to the tracks. In the variational tracking algorithm described herein, data association and filtering are performed together to approximate the optimal state of the track given all previous data and all possible associations. To this end, a variational Bayes (VB) technique is applied to approximate the solution to a corresponding probabilistic graphical model of the tracking problem, providing an algorithm that scales linearly with the number of time steps. Current algorithms, such as multiple hypothesis trackers (MHT), instead scale exponentially with the number of time steps. With the linear scaling of the variational tracking algorithm, an approximation of the states of tens of tracks, marginalized over all possible data associations, for as many as thirty time steps, is achievable. Due to the difficulties imposed by the data association constraints, the algorithm uses a hybrid method utilizing both variational and loopy belief propagation components to make inference efficient and tractable. Further, the algorithm incorporates track management into the model itself as a series of track metastates. This allows for a significant performance gains over tradition heuristic approaches.

Figure 1:
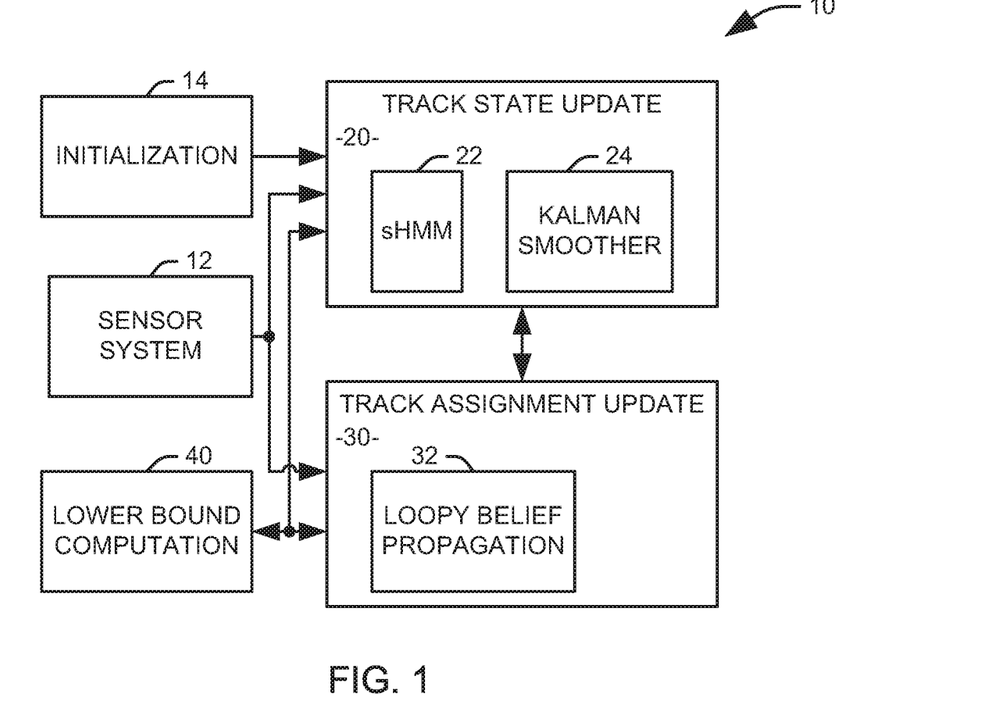
FIG. 1 illustrates a system for tracking a plurality of moving objects.

FIG. 1 illustrates a system 10 for tracking a plurality of moving objects. The system 10 utilizes a probabilistic tracking algorithm that incorporates combinatorial data association constraints and model-based track management using variational Bayes. A Bethe entropy approximation is used to incorporate data association constraints that are generally ignored in existing probabilistic tracking algorithms. The variational Bayes assignment posterior utilized in the system has an induced factorization over time with regard to assignment matrices, allowing the computational cost of the variational approach to be linear in window length as opposed to the exponential cost of existing approaches. Compared to existing methods, such as maximum a posterior inference (MAP), the current system utilizes a weaker approximation for the posterior distributions, but provides a significant increase in efficiency and accuracy. The system also utilizes new approximate inference methods on assignment matrices and a new conjugate assignment prior (CAP).

The system includes a sensor system 12 configured to provide a set of measurements representing at least respective positions of the plurality of moving objects. The sensor system 12 can include, for example, a camera operating in visible, infrared, or ultraviolet light, or a transceiver for receiving radio frequency or microwave radiation. In one implementation, the sensor system 12 is a radar system. To provide a starting point for the iterative analysis, an initialization component 14 is configured to initialize the posterior probability distribution for a plurality of possible assignments of the set of measurements to a set of tracks representing the moving objects. In the illustrated implementation, a default distribution with random perturbations is used.

A track state updating component 20 is configured to determine an estimate of a posterior probability distribution for a plurality of track states from an estimate of the posterior probability distribution for a plurality of possible assignments of the set of measurements to a set of tracks representing trajectories of the plurality of moving objects and the set of measurements. In the illustrated example, the track state updating component 20 updates, for each track, an associated position state and an associated metastate representing the activity or dormancy of a track, such that the track update component manages a status of the plurality of tracks. Many tracking algorithms unrealistically assume that the number of tracks is known apriori and fixed, with additional "wrapper logic" placed around the trackers to initiate and destroy tracks. This logic involves the use of heuristics such as M-of-N logic. By incorporating the track management into the track update component in a model-based manner, significant performance gains can be realized, as the system 10 simultaneously performs inference for track management, data association, and state estimation.

To this end, the track state updating component 20 includes a soft hidden Markov model (sHMM) 22 for updating the metastates of the plurality of tracks. For example, detection probabilities, representing the likelihood that the track is active at the time step, can be determined for each time step, for example, and a forward-backward algorithm, or similar analysis, can be applied to the model and the determined detection probabilities to update the metastates. For the position states, the track state updating component 20 can include a Kalman smoother 24. As part of the position state update, the track state updating component 20 can calculate a set of pseudomeasurements from a set of measurements and the estimated posterior probability distribution for a plurality of possible assignments of the set of measurements to a set of tracks. The Kalman smoother 24 can be applied to the pseudomeasurements to calculate an update for the plurality of track states.

Once the estimate of the posterior distribution for the track states is determined, is it provided to each of a track assignment updating component 30 and a lower bound computation component 40. The track assignment updating component 30 is configured to determine a new estimate of the posterior probability distribution for the plurality of possible assignments of the set of measurements to the set of tracks from the set of measurements and the estimate of a posterior probability distribution for a plurality of track states. The illustrated implementation uses a Bethe entropy approximation to incorporate the one-to-one restrictions of the track assignment process. Accordingly, the track assignment updating component 30 utilizes a loopy belief propagation (LBP) algorithm 32 to calculate the new estimate of the posterior probability distribution for the plurality of possible assignments of the set of measurements to the set of tracks. Once the estimate of the assignment posterior distribution is updated, it is provided to each of the track state updating component 20 and the lower bound computation component 40. The track state updating component 20 can then generate a new estimate for the posterior distribution for the track states using the improved estimate for the assignment posterior distribution.

The lower bound computation component 40 is configured to compute a variational lower bound, representing a lower bound for the marginal probability of the set of measurements given a model defined by the new estimate of the posterior probability distribution and the estimate of a posterior probability distribution for a plurality of track states. Each of the track state updating component 20 and the track assignment updating component 30 are responsive to the lower bound computation component 40, such that the estimates of the posterior distributions determined at these components are accepted once the lower bound falls below a threshold value. Accordingly, the track state updating component 20, the track assignment updating component 30, and the lower bound computation component 40 collectively perform an iterative determination of the posterior probability distribution for the plurality of possible assignments of the set of measurements to the set of tracks and the posterior probability distribution for a plurality of track states until the variational lower bound is less than a threshold value.

In view of the foregoing structural and functional features described above, methods in accordance with various aspects of the present invention will be better appreciated with reference to FIGS. 2-5. While, for purposes of simplicity of explanation, the methods of FIGS. 2-5 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method in accordance with an aspect of the present invention.

Figure 2:
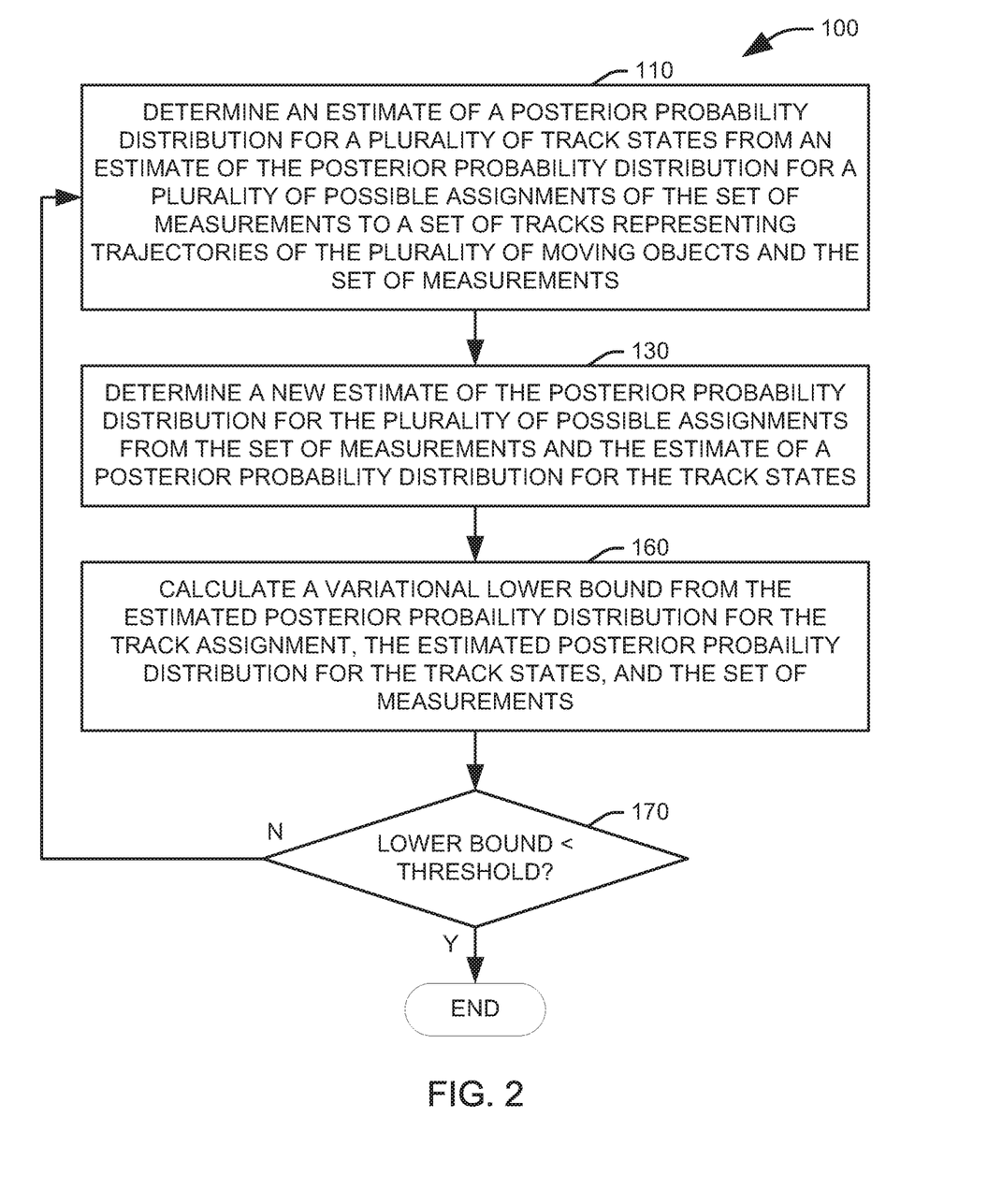
FIG. 2 illustrates one example of a method for tracking moving objects.
Figure 3:
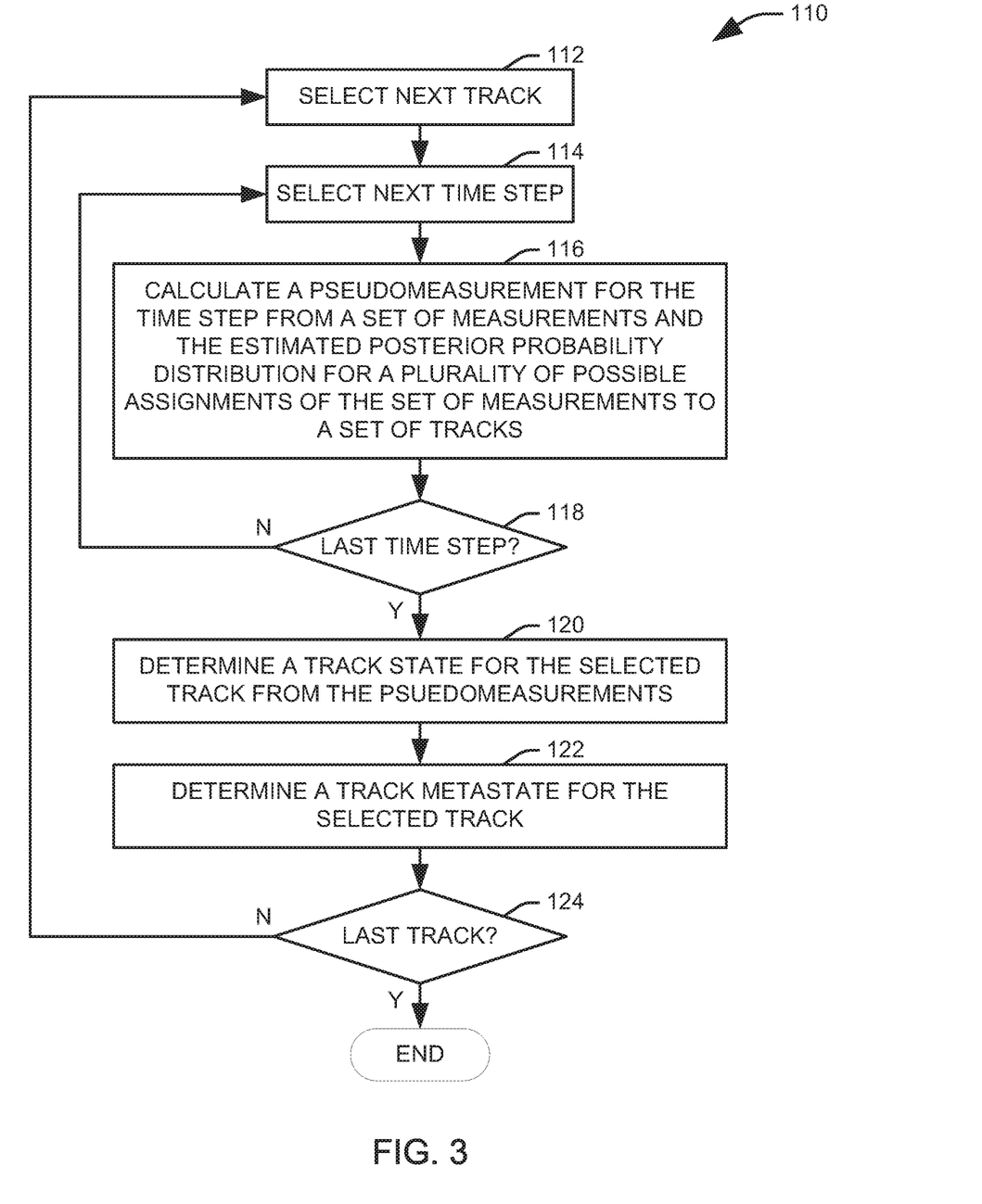
FIG. 3 illustrates one example of a method for estimating the posterior probability distribution for a plurality of track states.
Figure 4:
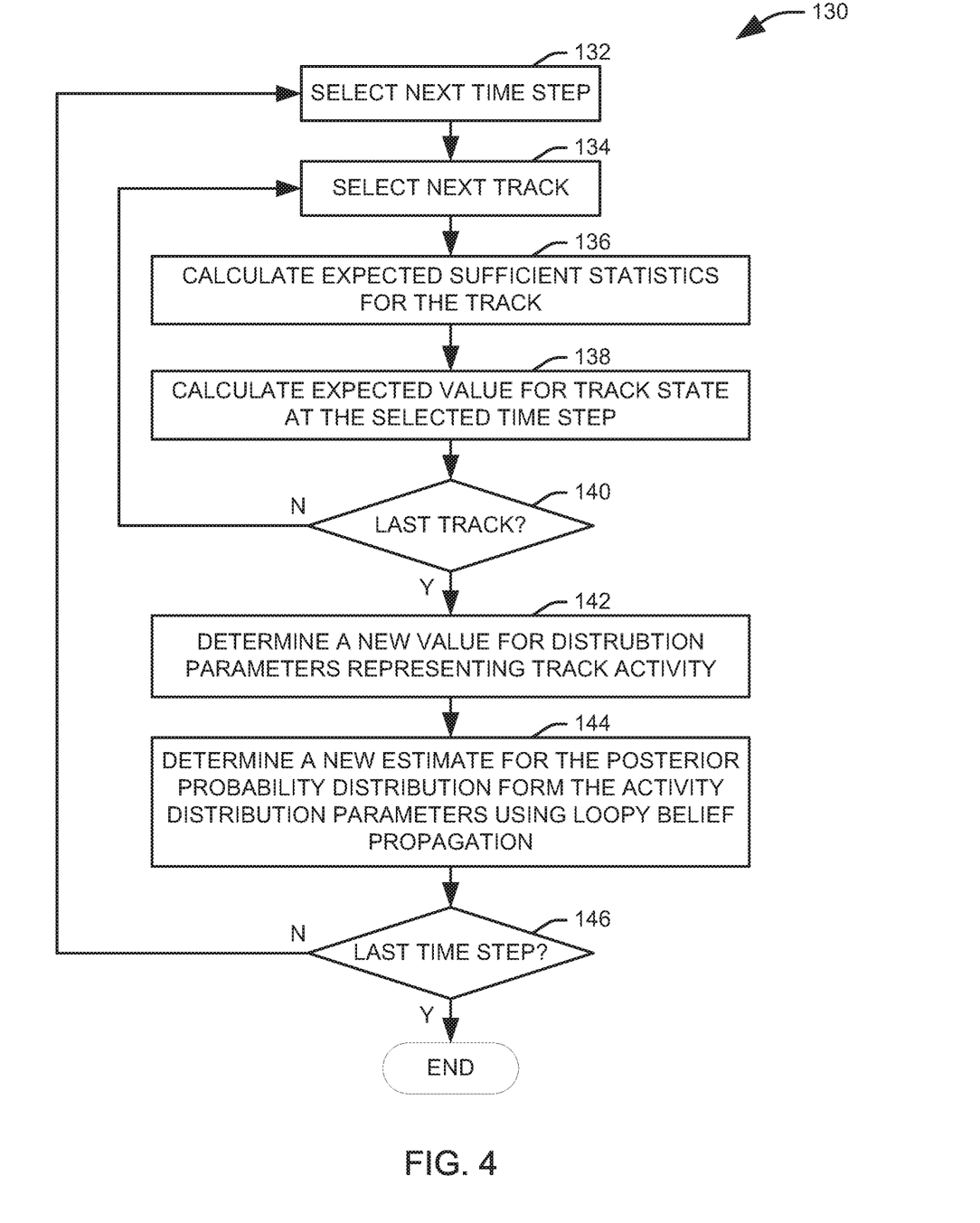
FIG. 4 illustrates a method for generating a new estimate of the posterior probability distribution for the plurality of possible assignments of the set of measurements to the set of tracks.
Figure 5:
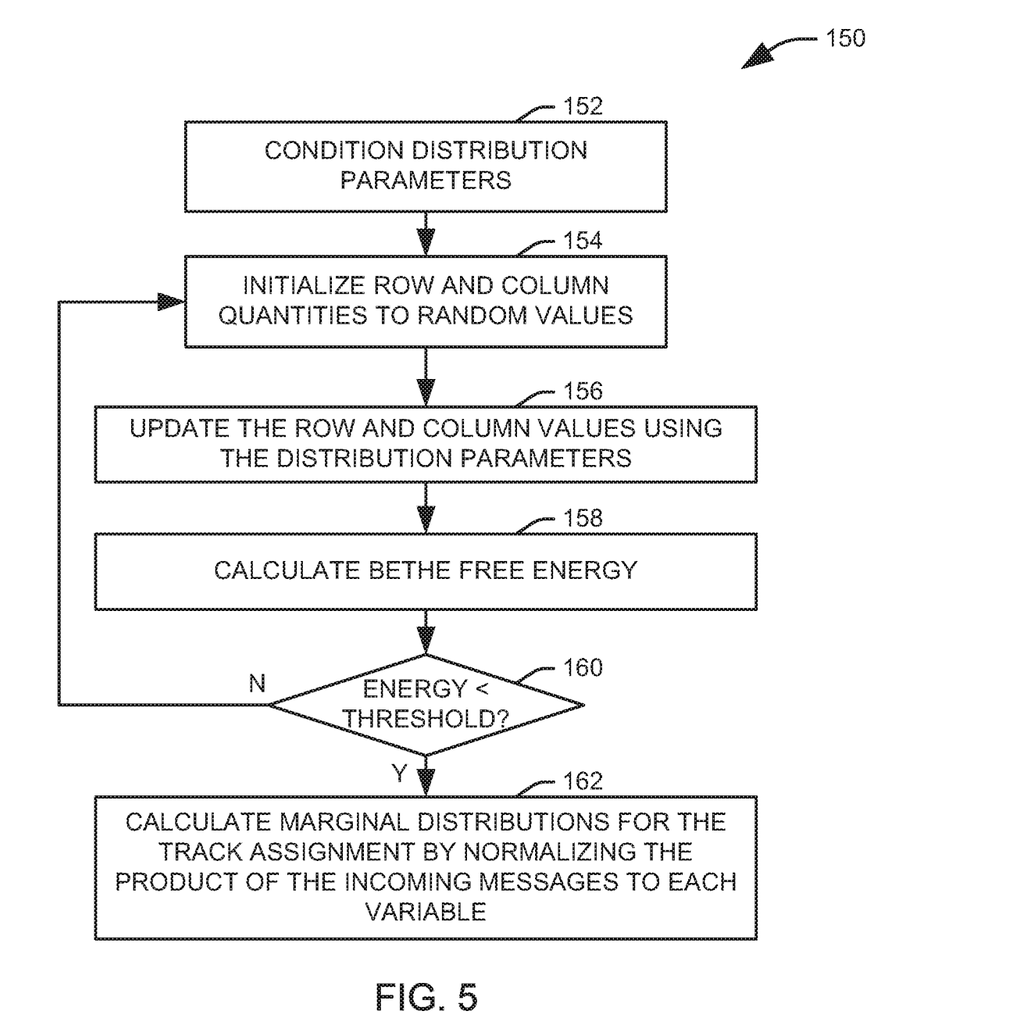
FIG. 5 illustrates a method for calculating an estimate of the posterior probability distribution for the track assignment using a loopy belief propagation process.

FIG. 2 illustrates one example of a method 100 for tracking moving objects from a set of measurements provided by an associated sensor system. FIGS. 3-5 describe a specific implementation of the various steps 110, 130, and 150 of FIG. 2. To better describe this specific implementation, it is helpful to establish a standard notation. In this implementation, the set of measurements comprises measurements of $N_1$ discrete time steps, referred to as frames, where $N_1$ is an integer greater than one, such that each object of the plurality of objects is expected to be represented by $N_1$ individual measurements. Specifically, for each time step, $k \in N_0$, $N_z(k) \in N_1$ measurements in a matrix $Z_k = \{z_{j,k}\}_{j=1}^{N_z(k)}$ are observed from both real objects and clutter (spurious measurements). In the illustrated example, $z_{j,k} \in Z$ is a vector of position measurements in three-dimensional space. In data association, an assignment matrix A is estimated, where $A_{ij} = 1$ if and only if track i is associated with track j. The assignment matrix is constrained such that each track can be associated with only one measurement, and each measurement can be associated with only one track, such that:

$$\sum_{i=0}^{N_T} A_{ij} = 1, j \in 1:N_Z, \sum_{j=0}^{N_Z} A_{ij} = 1, i \in 1:N_T, A_{00} = 0. \quad (1)$$

The zero indices of $A \in \{0,1\}^{N_T+1 \times N_z+1}$ are the "dummy row" and "dummy column" to represent the assignment of a measurement to clutter and the assignment of a track to a missed detection.

The inventors have determined that the cost functions utilized in the maximum a posteriori optimization (MAP) in multiple hypothesis tracking assume that a number of tracks, $N_T$ is known a priori and the $N_Z$ is random. The corresponding generative process on assignment matrices is therefore implemented by starting with a one-to-one mapping from measurement to tracks, $A \leftarrow I_{N_T \times N_T}$, with each track observed with a probability $P_D \in [0,1]^{N_T}$. Only the columns of detected tracks are kept, such that $A \leftarrow A(\cdot,d), d_i \cdot \text{Bernoulli}(P_D(i))$. A Poisson number of clutter measurements is sampled: $A \leftarrow [A, 0_{N_T \times N_c}]$, $N_C \sim \text{Poisson}(\lambda)$. A random permutation vector, $\pi$, is used to make the order of the measurements arbitrary, $A \leftarrow A(\cdot,\pi)$, and a dummy row and column are added to the assignment matrix to satisfy the constraints in (1). This provides a normalized prior on assignments:

$$P(A \mid P_D) = \lambda^{N_c} \exp(-\lambda)/N_Z! \prod_{i=1}^{N_T} P_D(i)^{d_i}(1 - P_D(i))^{1-d_i}, \quad (2)$$

It will be appreciated that the detections d, $N_Z$, and clutter measurement count, $N_c$, are deterministic functions of A.

As mentioned previously, a track model for updating a plurality of track states is implemented as over K time steps, where K is a positive integer greater than one. A set of latent states, $x_{1:K} \in \chi^K$, follow a Markov process, while the measurements, $z_{1:K} \in Z^K$, are iid conditional on the track state, such that:

$$p(z_{1:K}, x_{1:K}) = p(x_1) \prod_{k=2}^{K} p(x_k \mid x_{k-1}) \prod_{k=1}^{K} p(z_k \mid x_k), \quad (3)$$

where the track and measurements indices i and j have been omitted for brevity. Although the systems and methods taught herein can be used with more general models, in the illustrated example, each track independently follows a linear system, such as a Kalman filter, such that:

$$p(x_k|x_{k-1}) = \mathcal{N}(x_k|Fx_{k-1},Q) p(z_k|x_k) = \mathcal{N}(z_k|Hx_k,R) \quad (4)$$

The track states can be augmented with a Markov model with an active/dormant metastate, $s_k$, in a 1-in-N encoding to address track management, such that:

$$P(s_{1:K}) = P(s_1) \prod_{k=2}^{K} P(s_k | s_{k-1}), s_k \in \{0, 1\}^{N_S}. \quad (5)$$

This model allows the system to handle an unknown number of tracks by making $N_T$ arbitrarily large. The detection probability, $P_D$, is now a function of s with a very small $P_D$ in the dormant state and a larger $P_D$ in the active state. Extensions with a larger number of states $N_S$ can be implemented using the teachings provided herein. The collection of track metastates over all tracks at frame k are referred to herein as $S_k := \{s_{i,k}\}_{i=1}^{N_T}$, and likewise, $X_k := \{x_{i,k}\}_{i=1}^{N_T}$.

Combining the assignment process and track models to get the full model joint:

$$p(Z_{1:K}, X_{1:K}, A_{1:K}, S_{1:K}) = \quad (6)$$

$$\prod_{k=1}^{K} \Box p(Z_k | X_k, A_k) p(X_k | X_{k-1}) P(S_k | S_{k-1}) P(A_k | S_k) =$$

$$\prod_{k=1}^{K} P(A_k | S_k) \cdot \prod_{i=1}^{N_T} p(x_{i,k} | x_{i,k-1})$$

$$P(s_{i,k} | s_{i,k-1}) \cdot \prod_{j=1}^{N_z(k)} p_0(z_{j,k})^{A_{0j}^k} \prod_{i=1}^{N_T} p(z_{j,k} | x_{i,k}, A_{ij}^k = 1)^{A_{ij}^k},$$

where $p_0$ is the clutter distribution, which is often a uniform distribution. The traditional goal in tracking is to compute $p(X_k|Z_{1:k})$, the exact computation of which is intractable due to the "combinatorial explosion" in summing out the assignments $A_{1:k}$. The methods presented herein provide an improved approximation of $p(X_k|Z_{1:k})$.

To compute the posterior, $P(A|Z)$, it is helpful to determine what conjugate priors on A are possible. Deriving approximate inference procedures is often greatly simplified if the prior on the parameters is conjugate to the complete data likelihood: $p(Z, X|A)$. The conjugate prior for an exponential family (EF) complete likelihood can be derived as:

$$p(Z, X | A) = \prod_{j=1}^{N_Z} p_0(z_j)^{A_{0j}} \prod_{i=1}^{N_T} p(z_j | x_i, A_{ij} = 1)^{A_{ij}} \prod_{i=1}^{N_T} p(x_i) = \quad (7)$$

$$\prod_{i=1}^{N_T} p(x_i) \exp(1^T (A \odot L) 1),$$

$L_{ij} := \log p(z_j | x_i, A_{ij} = 1), L_{i0} := 0, L_{0j} := \log p_0(z_j),$ where the matrix $L \in \Re^{N_T+1 \times N_Z+1}$ represents log likelihood contributions from various assignments. The set of log likelihood values can include contributions from at least one likelihood value associated with a non-kinematic feature, such that as a radar cross-section. This gives the following exponential family quantities: base measure $$h(Z, X) = \prod_{i=1}^{N_T} p(x_i),$$

partition function $g(A)=1$, natural parameters $\eta(A)=$vec A, and sufficient statistics $S(Z, X)=$vec L. This implies the conjugate assignments prior (CAP) for $P(A|\chi)$:

$$CAP(A|\chi) := \quad (8)$$

$$S(\chi)^{-1} ||\{A \in \mathcal{A}\} \exp(1^T (\chi \odot A) 1), S(\chi) := \sum_{A \in \mathcal{A}} \exp(1^T (\chi \odot A) 1),$$

where $\mathcal{A}$ is the set of all assignment matrices that obey the one-to-one constraints in (1). Note that $\chi$ is a function of the track metastates S. The assignment prior of (2) can be recovered in the form of the CAP distribution of (8) via the following parameter settings, with $\sigma(\bullet)$ denoting the logistic:

$$\chi_{ij} = \log\left(\frac{P_D(i)}{(1 - P_D(i))\lambda}\right) = \sigma^{-1}(P_D(i)) - \log \lambda, \quad (9)$$

$i \in 1:N_T, j \in 1:N_Z, \chi_{0j} = \chi_{i0} = 0.$

Due of the symmetries in the prior of (9), the CAP distribution of (8) can be analytically normalized in this instance:

$$S(\chi)^{-1} = P(A_{1:N_T, 1:N_Z} = 0) = \text{Poisson}(N_Z|\lambda) \prod_{i=1}^{N_T} (1 - P_D(i)). \quad (10)$$

Given that the dummy row and columns of $\chi$ are zero in (9), the normalization of equation (10) allows the CAP distribution of (8) to match (2) for the 0 assignment case.

Although the conjugate prior (8) allows for "computation" of the posterior, $\chi_{posterior} = \chi_{prior} + L = \text{prior} + L$, computing $\mathbb{E} A]$ or $S(\chi)$ remains difficult. As will be explained in detail below, the illustrated example utilizes a loopy belief propagation algorithm to facilitate this determination.

The improved variational tracker of the illustrated method enforces the factorization constraint that the posterior factorizes across assignment matrices and latent track states:

$$p(A_{1:K}, X_{1:K}, S_{1:K}|Z_{1:K}) \approx q(A_{1:K}, X_{1:K}, S_{1:K}) = q(A_{1:K}) q(X_{1:K}, S_{1:K}). \quad (11)$$

In this formation, A can be conceptualized as the parameters and X and S can be conceptualized as the latent variables, and these two groups of variables can be factorized, giving a variational lower bound:

$$\mathcal{L}(q) = \mathbb{E}_q [\log p(Z_{1:K}, X_{1:K}, A_{1:K}, S_{1:K})] + H[q(X_{1:K}, S_{1:K})] + H[q(A_{1:K})], \quad (12)$$

where $H[\bullet]$ represents the Shannon entropy. From the variational Bayes lower bound in (12) and the model in (6), an induced factorization can be determined without further approximation:

$$q(A_{1:K}) = \prod_{k=1}^{K} q(A_k), q(X_{1:K}, S_{1:K}) = \prod_{i=1}^{N_T} q(x_i, \cdot) q(s_i, \cdot) \quad (13)$$

It can be noted that the approximate posterior on assignment matrices factorizes over time, and the approximate posterior on latent states factorizes across tracks.

At 110, an estimate of a posterior probability distribution is determined for a plurality of track states from an estimate of the posterior probability distribution for a plurality of possible assignments of the set of measurements to a set of tracks representing trajectories of the plurality of moving objects and the set of measurements. It will be appreciated that the method is iterative, such that an estimate of the posterior probability distribution for the plurality of possible assignments will usually be available from a previous step in the method. For the first step of the method, however, it will be necessary to generate an initial distribution. To this end, an estimate of the posterior probability distribution for the plurality of possible assignments can be initialized as a default distribution with random perturbations before the method 100 begins.

FIG. 3 illustrates one example of a method 110 for estimating the posterior probability distribution for a plurality of track states. In the illustrated example, the updates for the track states, $x_i$, and the metastates, $s_i$, can be determined from the induced factorization in (13), and each update can be derived separately. Accordingly, the method begins at 112, where a next track is selected. It will be appreciated, of course, that in a first iteration of the method, the selected "next" track will be a first track. The method 110 then proceeds to 114, where a next time step, or frame, is selected. Again, in a first iteration for each track, the selected time step is a first time step.

At 116, a pseudomeasurement is calculated for the selected time step from a set of measurements and the estimated posterior probability distribution for a plurality of possible assignments of the set of measurements to a set of tracks. The variational updates for the track states representing position, $x_i$, can be expressed as follows, denoting equality to within an additive constant with $\stackrel{c}{=}$:

$$\log q(x_i, \cdot) \stackrel{c}{=} \log p(x_i, \cdot) + \sum_{k=1}^{K} \sum_{j=1}^{N_Z(k)} \mathbb{E}[A_{ij}^k] \log \mathcal{N}(z_{j,k}|Hx_{i,k}, R) \quad (14)$$

$$\Rightarrow q(x_i, \cdot) \propto p(x_i, \cdot) \prod_{k=1}^{K} \prod_{j=1}^{N_Z(k)} \mathcal{N}(z_{j,k}|Hx_{i,k}, R/\mathbb{E}[A_{ij}^k]). \quad (15)$$

Using (6), this can be shown to proportional to:

$$q(x_i, \cdot) \propto \quad (16)$$

$$p(x_i, \cdot) \prod_{k=1}^{K} \mathcal{N}(\tilde{z}_{i,k}|Hx_{i,k}, R/\mathbb{E}[d_{i,k}]), \tilde{z}_{i,k} := \frac{1}{\mathbb{E}[d_{i,k}]} \sum_{j=1}^{N_Z} \mathbb{E}[A_{ij}^k] z_{j,k},$$

$$\text{with } \mathbb{E}[d_{i,k}] = 1 - \mathbb{E}[A_{i0}^k] = \sum_{j=1}^{N_Z} \mathbb{E}[A_{ij}^k].$$

In addition to the pseudomeasurements, $\tilde{z}_{i,k}$, detection probabilities, $P_D$, representing the likelihood that the track is active at the time step, can also be determined for each time step. The system then determines at 118 if values have been calculated for all time steps. If not (N), the method returns to 114 to select a next time step. Otherwise (Y), the method advances to 120, where a track state for the selected track is determined from the pseudomeasurements for each track.

The form of the posterior, $q(x_i, \cdot)$, is equivalent to a linear dynamic system with pseudomeasurements, $\tilde{z}_{i,k}$, and non-stationary measurement covariance $R/\mathbb{E}[d_{i,k}]$. Accordingly, in the illustrated implementation, the state update, $q(x_i, \cdot)$, can be determined via a Kalman smoothing process.

At 122, a track metastate for each track is determined from the calculated probabilities for each track. The posterior on the track metastates can be expressed as:

$$\log q(s_i, \cdot) \stackrel{c}{=} \quad (17)$$

$$\log P(s_i, \cdot) + \sum_{k=1}^{K} \mathbb{E}_q(A_k)[\log P(A_k|S_k)] \stackrel{c}{=} \log P(s_i, \cdot) + \sum_{k=1}^{K} s_{i,k}^T \ell_{i,k},$$

$$\ell_{i,k}(s) := \mathbb{E}[d_{i,k}] \log(P_D(s)) + (1 - \mathbb{E}[d_{i,k}]) \log(1 - P_D(s)), \quad (18)$$
$$s \in 1:N_S$$

$$\Rightarrow q(s_i, \cdot) \propto P(s_i, \cdot) \prod_{k=1}^{K} \exp(s_{i,k}^T \ell_{i,k}), \quad (19)$$

when (18) follows from (2), above. If $P(s_i, \cdot)$ follows a Markov chain, then the form for $q(s_i, \cdot)$ is the same as a hidden Markov model (HMM) with emission log likelihoods $l_{i,k} \in [\mathfrak{R}^-]^{N_S}$. Therefore, the metastate posterior $q(s_i, \cdot)$ update can be implemented via a forward-backward inference algorithm on the calculated probabilities $P_D$. The algorithm works in an online fashion using a sliding window. The system then determines at 124 if track states have been updated for all tracks. If not (N), the method returns to 112 to select a next track. Otherwise (Y), the method terminates, returning the posterior probability distribution for a plurality of track states.

Returning to FIG. 2, at 130, a new estimate of the posterior probability distribution for the plurality of possible assignments of the set of measurements to the set of tracks is determined from the set of measurements and the estimate of a posterior probability distribution for a plurality of track states. FIG. 4 illustrates a method 130 for generating a new estimate of the posterior probability distribution for the plurality of possible assignments of the set of measurements to the set of tracks. At 132, a next time step is selected. It will be appreciated, of course, that in a first iteration of the method, the selected next time step will be a first time step. The method 130 then proceeds to 134, where a next track is selected. Again, in a first iteration for each time step, the selected track is a first track.

At 136, expected sufficient statistics, $E_{q(Ak)}[Lk]$, are calculated for the selected track and time step from a set of likelihood values. At 138, an expected value for a track state associated with the selected track at the selected time step, $E_{q(S_k)}[\chi_k]$, is calculated from the expected sufficient statistics for that time step. For example, $\chi_k$ can be calculated using (9) above. It is then determined at 140 if all of the tracks have been evaluated for the selected time step. If not (N), the method returns to 134 to select a next track.

Otherwise, the method advances to 142, where a new value for the distribution parameters, $\chi'_k$, are calculated from the expected values for the track states for that time step and the expected sufficient statistics, such that $\chi'_k \leftarrow E[\chi_k] + E[L_k]$. At 144, the new estimate of the posterior probability distribution for the plurality of possible assignments of the set of measurements to the set of tracks from distribution parameters. Exact updates for the assignment matrix under the lower bound yields a product of CAP distributions:

$$q(A_{1:K}) = \prod_{k=1}^{K} CAP(A_k | \mathbb{E}_{q(X_k)}[L_k] + \mathbb{E}_{q(S_k)}[x_k]). \quad (20)$$

To obtain a tractable algorithm, a loopy belief propagation algorithm can be used to compute $\mathbb{E}_{q(A_k)}[A_k]$, for use in (16) and (19), above. The CAP distribution from (8) can be represented as a factor graph:

$$CAP(A|x) \propto \prod_{i=1}^{N_T} f_i^R(A_{i\prime}) \prod_{j=1}^{N_Z} f_j^C(A_{\prime j}) \sum_{i=0}^{N_T} \sum_{j=0}^{N_Z} f_{ij}^S(A_{ij}), \quad (21)$$

with $f_i^R(v) := \mathbb{I}\{\sum_{i=0}^{N_x} v_j = 1\}$ (R for row factors), $f_i^C(v) := \mathbb{I}\{\sum_{i=0}^{N_T} v_i = 1\}$ (C for column vectors), and $f_{ij}^S(v) := \exp(\chi_{ij} v)$. Reparameterization methods are applied to convert this factor graph to a pairwise factor graph, where derivation of a Bethe free energy is facilitated. The Bethe free entropy is:

$$H_\beta[q(A)] := \sum_{i=1}^{N_T} \sum_{j=0}^{N_Z} H[q(r_i, A_{ij})] + \sum_{j=1}^{N_Z} \sum_{i=0}^{N_T} H[q(c_j, A_{ij})] - \quad (22)$$
$$\sum_{i=1}^{N_T} N_Z H[q(r_i)] - \sum_{j=1}^{N_Z} N_T H[q(c_j)] - \sum_{i=1}^{N_T} \sum_{j=1}^{N_Z} H[q(A_{ij})]$$

$$= \sum_{i=1}^{N_T} H[q(A_{i\prime})] + \sum_{j=1}^{N_Z} H[q(A_{\prime j})] - \sum_{i=1}^{N_T} \sum_{j=1}^{N_Z} H[q(A_{ij})], \quad (23)$$

where the pairwise conversion uses constrained auxiliary variables $r_i := A_i$ and $c_j := A_j$ and the implied relations $H[q(r_i, A_{ij})] = H[q(r_i)] + H[q(A_{ij}|r_i)] = H[q(r_i)] = H[q(A_{i\cdot})]$.

The method 130 uses an altered variational lower bound, $\mathcal{L}_\beta(q)$, which replaces the entropy $H[q(A_k)]$ with $H_\beta[q(A_k)]^2$. It will be appreciated that $\mathcal{L}_\beta(q) \stackrel{c}{=} \mathcal{L}(q)$ with respect to $q(X_{i:K}, S_{1:K})$ which implies that the state posterior updates under the old lower bound in (16) and (19) remain unchanged under the new lower bound. To get the update equations for $q(A_k)$, the new lower bound is expressed in terms of $q(A_{1:K})$, such that:

$$\mathcal{L}_\beta(q) \stackrel{c}{=} \mathbb{E}_q[\log p(Z_{1:K} | X_{1:K}, A_{1:K})] + \mathbb{E}_q[\log P(A_{1:K} | S_{1:K})] + \quad (24)$$
$$\sum_{k=1}^{K} H_\beta[q(A_k)]$$

$$\stackrel{c}{=} \sum_{k=1}^{K} \mathbb{E}_{q(A_k)}[1^T (A_k \odot \mathbb{E}_{q(X_k)}[L_k] + \mathbb{E}_{q(S_k)}[x_k]))1] + \quad (25)$$
$$\sum_{k=1}^{K} H_\beta[q(A_k)]$$

$$\stackrel{c}{=} \sum_{k=1}^{K} \mathbb{E}_{q(A_k)}[\log CAP(A_k | \mathbb{E}_{q(X_k)}[L_k] + \mathbb{E}_{q(S_k)}[x_k])] + H_\beta[q(A_k)]. \quad (26)$$

This corresponds to the Bethe free energy of the factor graph described in (21), with $\mathbb{E}[L_k] + \mathbb{E}[\chi_k]$ as the CAP parameter. Therefore, the estimate of the posterior probability distribution for the track assignment can be determined using loopy belief propagation.

FIG. 5 illustrates a method 150 for calculating an estimate of the posterior probability distribution for the track assignment using a loopy belief propagation process. At 152, the distribution parameters, $\chi_k$, at for each time step, are conditioned, with the columns normalized in log scale and values below a threshold value clipped at the threshold value (e.g., −25). At 154, initial row and column quantities, μ and v, are initialized to random values to break symmetry. Specifically, the row and column quantities are defined as;

$$\mu_{ij}^R := msg_{f_i^R \to A_{ij}}, \mu_{ij}^C := msg_{f_j^C \to A_{ij}}, v_{ij}^R := msg_{A_{ij} \to f_i^R}, \quad (27)$$
$$v_{ij}^C := msg_{A_{ij} \to f_j^C} \quad v_{ij}^R(x) = \mu_{ij}^C(x) f_{ij}^S(x), \mu_{ij}^R(1) = \prod_{k \neq j} v_{ik}^R(0),$$
$$\mu_{ij}^R(0) = \sum_{l \neq j} v_{il}^R(1) \prod_{k \neq j, l} v_{ik}^R(0),$$

where all of the messages form functions in $\{0,1\} \to \mathfrak{R}^+$. This formulation exploits the fact that there is only one non-zero value in the row $A_i$.

At 156, the row and column values are updated using the distribution parameters, $\chi_k$. It can be noted from (27) that:

$$\mu_{ij}^R(1) = \quad (28)$$
$$\prod_{k=0}^{N_Z} v_{ik}^R(0) / v_{ij}^R(0) \Rightarrow \tilde{\mu}_{ij}^R := \frac{\mu_{ij}^R(0)}{\mu_{ij}^R(1)} = \sum_{l=0}^{N_Z} \frac{v_{il}^R(1)}{v_{il}^R(0)} - \frac{v_{ij}^R(1)}{v_{ij}^R(0)} \in \mathbb{R}^+,$$

The ratio of the messages to the row factors can then be expressed as:

$$\tilde{v}_{ij}^R := v_{ij}^R(1) / v_{ij}^R(0) = (\mu_{ij}^C(1) / \mu_{ij}^C(0)) \exp(\chi_{ij}) \in \mathfrak{R}^+ \quad (29)$$

The relations in (27)-(29) can be applied to the column messages to acquire a message passing update scheme in terms of message ratios:

$$\tilde{\mu}_{ij}^R(1) = \sum_{l=0}^{N_Z} \tilde{v}_{il}^R - \tilde{v}_{ij}^R, \tilde{v}_{ij}^R = \frac{\exp(x_{ij})}{\tilde{\mu}_{ij}^C}, \tilde{\mu}_{ij}^C = \sum_{l=0}^{N_T} \tilde{v}_{il}^C - \tilde{v}_{ij}^C, \quad (30)$$
$$\tilde{v}_{ij}^C = \frac{\exp(x_{ij})}{\tilde{\mu}_{ij}^R}.$$

Once the row and column values from the loopy belief propagation have been updated, the lower Bethe free energy is calculated at 158, for example, via the relation shown in (26) above. At 160, it is determined if the calculated free energy is below a threshold value. If not (N), the method 150 returns to 156 to update the row and column values. If so (Y), at 162 the marginal distributions for the track assignment are calculated by normalizing the product of the incoming messages to each variable, such that: $\mathbb{E}[A_{ij}] = P(A_{ij} = 1) = \sigma(\chi_{ij} - \log \tilde{\mu}_{ij}^R - \log \tilde{\mu}_{ij}^C)$.

Returning to FIG. 4, once the loopy belief propagation algorithm has finished for a given time step, it is determined at 146 if marginal distributions have been updated for all time steps. If not (N), the method returns to 132 to select a next time step. Otherwise (Y), the method terminates, returning the posterior probability distribution for the track assignment.

Returning to FIG. 2, once the posterior distributions for the track states and the track assignment have been determined, the method advances to 160, where a variational lower bound is calculated from the new estimate of the posterior probability distribution for the plurality of possible assignments of the set of measurements to the set of tracks, the estimate of a posterior probability distribution for a plurality of track states, and the set of measurements. The variational lower bound represents a lower bound for the marginal probability of the set of measurements given a model defined by the new estimate of the posterior probability distribution and the estimate of a posterior probability distribution for a plurality of track states. For example, the variational lower bound can be calculated using the relation in (12).

At 170, it is determined if the calculated variational lower bound is less than a threshold value. If not (N), the method returns to 110 to update the estimate of the posterior distribution of the track states using the new estimate for the posterior distribution of the track assignment. If so (Y), the method terminates and returns the current estimates for the track state and track assignment distributions.

Figure 6:
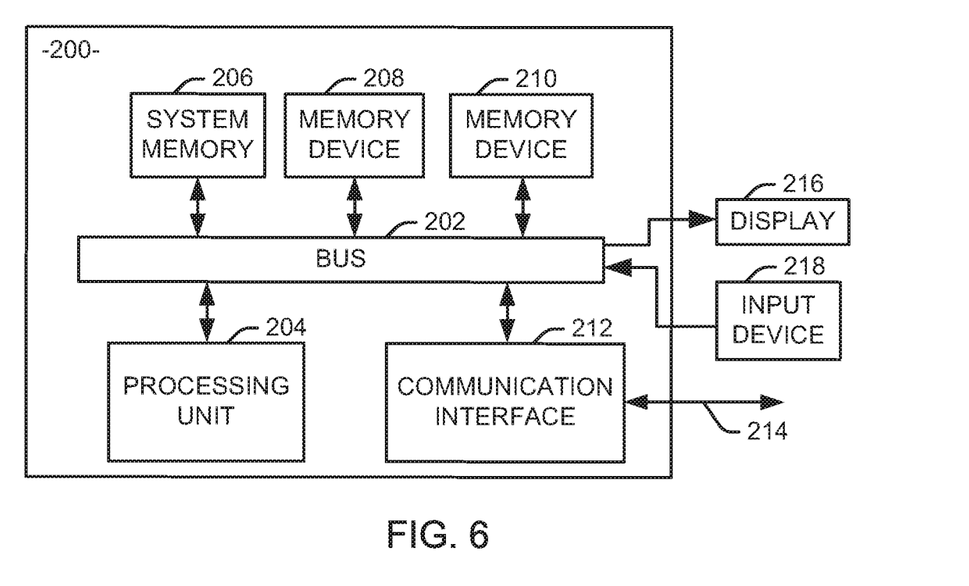
FIG. 6 illustrates a schematic block diagram illustrating an exemplary system of hardware components capable of implementing examples of the systems and methods disclosed in FIGS. 1-5.

FIG. 6 is a schematic block diagram illustrating an exemplary system 200 of hardware components capable of implementing examples of the systems and methods disclosed in FIGS. 1-5. The system 200 can include various systems and subsystems. The system 200 can be a personal computer, a laptop computer, a workstation, a computer system, an appliance, an application-specific integrated circuit (ASIC), a server, a server blade center, a server farm, etc.

The system 200 can includes a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand-alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings.

Additionally or alternatively, the system 200 can access an external data source or query source through the communication interface 212, which can communicate with the system bus 202 and the communication link 214.

In operation, the system 200 can be used to implement one or more parts of n object tracking system using variational tracking. Computer executable logic for implementing the system resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution, and can include either a single medium or multiple non-transitory media operatively connected to the processing unit 204.

The invention has been disclosed illustratively. Accordingly, the terminology employed throughout the disclosure should be read in an exemplary rather than a limiting manner. Although minor modifications of the invention will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

Having described the invention, we claim:

1. A method for tracking a plurality of moving objects from a set of measurements provided by an associated sensor system, the method comprising:
    determining an estimate of a posterior probability distribution for a plurality of track states from an estimate of the posterior probability distribution for a plurality of possible assignments of the set of measurements to a set of tracks representing trajectories of the plurality of moving objects and the set of measurements;
    determining a new estimate of the posterior probability distribution for the plurality of possible assignments of the set of measurements to the set of tracks from the set of measurements and the estimate of the posterior probability distribution for the plurality of track states;
    determining a variational lower bound, representing a lower bound for a marginal probability of the set of measurements given a model defined by the new estimate of the posterior probability distribution for the plurality of possible assignments of the set of measurements to the set of tracks and the estimate of a posterior probability distribution for a plurality of track states, from the new estimate of the posterior probability distribution for the plurality of possible assignments of the set of measurements to the set of tracks, the estimate of a posterior probability distribution for a plurality of track states, and the set of measurements;
    iteratively repeating the steps of determining an estimate of a posterior probability distribution for a plurality of track states, determining a new estimate of the posterior probability distribution for the plurality of possible assignments of the set of measurements to the set of tracks, and determining a variational lower bound until the variational lower bound is less than a threshold value; and
    updating the plurality of track states with the set of measurements according to the new estimate of the posterior probability distribution for the plurality of possible assignments of the set of measurements to the set of tracks when the variational lower bound is less than the threshold value.

2. The method of claim 1, further comprising initializing the posterior probability distribution for the plurality of possible assignments of the set of measurements to the set of tracks as a default distribution with random perturbations to provide the estimate of the posterior probability distribution for the plurality of possible assignments of the set of measurements to the set of tracks representing trajectories of the plurality of moving objects and the set of measurements before a first iteration of a plurality of iterations associated with iteratively repeating the steps of determining the estimate of the posterior probability distribution for the plurality of track states, determining the new estimate of the posterior probability distribution for the plurality of possible assignments of the set of measurements to the set of tracks, and determining the variational lower bound until the variational lower bound is less than a threshold value.

3. The method of claim 1, wherein the set of measurements comprises measurements of N discrete time steps, where N is an integer greater than one, such that each object of the plurality of objects is expected to be represented by N individual measurements.

4. The method of claim 3, where determining an estimate of a posterior probability distribution for a plurality of track states comprises:
  calculating a pseudomeasurement for each time step for each track of the set of tracks from the set of measurements and the estimated posterior probability distribution for a plurality of possible assignments of the set of measurements to a set of tracks to provide a plurality of pseudomeasurements for each track; and
  determining a track state for each track from the plurality of pseudomeasurements for each track.

5. The method of claim 4, wherein the plurality of track states include, for each track, an associated position state and an associated metastate representing the activity or dormancy of a track, such that calculating a track state for each track comprises calculating a position state for each track, the method further comprising:
  calculating a probability that the track is active at each time step of each track to provide a plurality of calculated probabilities for each track; and
  determining a track metastate for each track from the plurality of calculated probabilities for each track.

6. The method of claim 5, wherein determining the track metastate for each track from the plurality of calculated probabilities for each track comprises applying a forward-backward inference process to a hidden Markov model representing the metastates.

7. The method of claim 4, wherein determining the track state for each track from the pseudomeasurements for each track comprises applying a Kalman smoothing process to the pseudomeasurements for the track.

8. The method of claim 3, wherein determining the new estimate of the posterior probability distribution for the plurality of possible assignments of the set of measurements to the set of tracks comprises:
  computing expected sufficient statistics for each track for each time step;
  computing an expected value for a track state associated with the track each time step from the expected sufficient statistics for that time step;
  calculating a set of distribution parameters, representing the likelihood that each track is active at a given time step, from the expected values of the track states for the time step and the expected sufficient statistics; and
  determining the new estimate of the posterior probability distribution for the plurality of possible assignments of the set of measurements to the set of tracks from the sets of distribution parameters for the plurality of time steps.

9. The method of claim 8, wherein determining the new estimate of the posterior probability distribution for the plurality of possible assignments of the set of measurements to the set of tracks from the sets of distribution parameters for the plurality of time steps comprises applying a loopy belief propagation process to the sets of distribution parameters for the plurality of time steps.

10. The method of claim 8, wherein the set of likelihood values comprises at least one likelihood value associated with a non-kinematic feature, such that the assignment of the set of measurements to the set of tracks utilizes at least one measurement other than respective positions, velocities, and accelerations of the plurality of moving objects.

11. The method of claim 10, wherein the associated sensor system is a radar system, and the non-kinematic feature is a radar cross-section.

* * * * *